US 6,609,184 B2

(12) United States Patent
Bradshaw et al.

(10) Patent No.: US 6,609,184 B2
(45) Date of Patent: *Aug. 19, 2003

(54) METHOD OF AND APPARATUS FOR RECOVERY OF IN-PROGRESS CHANGES MADE IN A SOFTWARE APPLICATION

(75) Inventors: Robert Bradshaw, San Jose, CA (US); Jack Jia, San Jose, CA (US); John Sully, Santa Cruz, CA (US); Britt Park, Mountain View, CA (US)

(73) Assignee: Interwoven, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/132,547

(22) Filed: Apr. 24, 2002

(65) Prior Publication Data

US 2002/0129042 A1 Sep. 12, 2002

Related U.S. Application Data

(63) Continuation of application No. 09/815,541, filed on Mar. 22, 2001, now Pat. No. 6,480,944.
(60) Provisional application No. 60/192,244, filed on Mar. 22, 2000.

(51) Int. Cl.[7] .............................................. G06F 17/30
(52) U.S. Cl. ........................ 711/162; 711/165; 714/6; 714/15
(58) Field of Search ................. 711/162, 165; 714/6, 15

(56) References Cited

U.S. PATENT DOCUMENTS

| | | | | |
|---|---|---|---|---|
| 5,555,371 A | * | 9/1996 | Duyanovich et al. | 714/13 |
| 5,557,737 A | * | 9/1996 | Wilhite et al. | 714/6 |
| 5,784,548 A | * | 7/1998 | Liong et al. | 711/106 |
| 5,838,907 A | * | 11/1998 | Hansen | 709/220 |
| 6,098,091 A | * | 8/2000 | Kisor | 709/100 |
| 6,195,760 B1 | * | 2/2001 | Chung et al. | 709/223 |
| 6,480,944 B2 | * | 11/2002 | Bradshaw et al. | 711/162 |
| 2001/0011265 A1 | * | 8/2001 | Cuan et al. | 707/1 |
| 2001/0027457 A1 | * | 10/2001 | Yee | 707/203 |
| 2001/0039594 A1 | * | 11/2001 | Park et al. | 709/311 |
| 2001/0044834 A1 | * | 11/2001 | Bradshaw et al. | 709/217 |
| 2002/0004824 A1 | * | 1/2002 | Cuan et al. | 709/208 |
| 2002/0089526 A1 | * | 7/2002 | Buxton et al. | 345/700 |

* cited by examiner

Primary Examiner—Reba I. Elmore
(74) Attorney, Agent, or Firm—Stevens Law Group; David R. Stevens

(57) ABSTRACT

Provided are a method and apparatus configured to enable the preservation and recovery of in-progress developments and changes as they are made in a system for development of content in the event of a process or system failure. The in-progress data developments and changes may be preserved while they are created, and may then be retrieved and recovered after the system or process is recovered. The in-progress data developments and changes may be preserved while they are created, and may then be retrieved and recovered after the system or process is recovered. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation. The invention further includes a method of and apparatus for recovering and restarting the actual process or system after such a failure. Utilizing one or both features, an application utilizing the invention may reduce the amount of data and process time lost as a result of a process or system failure.

21 Claims, 10 Drawing Sheets

METHOD OF AND APPARATUS FOR RECOVERY OF IN-PROGRESS CHANGES MADE IN A SOFTWARE APPLICATION

RELATED APPLICATIONS

This application is a continuation of application Ser. No. 09/815,541, filed Mar. 22, 2001 now U.S. Pat. No. 6,480,944 and claims the benefit of U.S. Provisional Application No. 60/192,244, filed Mar. 22, 2000. U.S. patent application Ser. No. 09/815,971, filed on the same day as this application, and entitled, "Method and Apparatus for Storing Changes to File Attributes Without Having to Store an Additional Copy of the File Contents," and U.S. patent application Ser. No. 09/815,496, filed on the same day as this application, and entitled, "Method And Apparatus For Automatically Deploying Data In A Computer Network," are hereby incorporated by reference.

BACKGROUND

The present invention relates to the field of storage apparati and techniques and, more particularly, to recovery of in-progress changes made during the use of a software application and to reduce downtime in the event of a system or process failure.

Conventional systems exist that include an automatic mechanisms configured to periodically save information automatically while an electronic software application is in use. For example, many word processing applications include this function. The automatically saved information is often preserved for subsequent retrieval once the system is turned on again, or when power is restored. Such mechanisms, however, do not fully address the problem of losing data, especially when a power failure or other system failure occurs. Conventional methods do not entirely account for all information that could be lost, such as work that is in-progress before a process or system failure occurs, but that was created or changed after the last automatic save occurs. Conventional systems lose this data upon a process or system failure.

One modern use of such an application is in the area of website development and maintenance. Applications specifically tailored to developing Internet websites are well known in the website development industry. Many of these applications offer simplified methods for designing and maintaining a website such as receiving, storing, arranging and delivering information within a website. In more advanced systems, information must be stored in multiple locations and in different files so that other advanced functions of the application program can operate and have access to certain information.

It is often a challenge to develop large websites due to the need to coordinate the efforts of many contributors. As a result, modern website development tools have been developed that enable multiple workstations to concurrently create website content. Furthermore, many websites need to be frequently modified, and contributors usually modify them in an ad hoc process. Problems occur when users from separate workstations try to update the same information on a website, confusing the process. Propounding the problem, many businesses require that their Internet sites be updated by the day, hour or minute, and by numerous contributors. And, as the number of contributors increases, so does the volume, and complexity of content, as well as its use. As information is created, it must be saved by all of these contributors, who may or may not be diligent in maintaining proper data preservation procedures. In the event of a power failure, for example, the problem is even more profound, as in-progress changes that have not been manually or automatically saved may be lost when a system loses power or otherwise shuts down. As a result, managing the website for efficiency and quality control has become difficult.

In response to these problems, system applications have been developed for managing website development. Some of these include software configuration management systems, document management systems and database publishing systems. In one such application, websites may be developed within work areas where individual website developers construct or maintain separate portions of content that define a website. This helps to spread out the tasks of website development to multiple people. The final contributions from each developer may then be incorporated into the final website.

There are several disadvantages associated with such known website development systems. For example, where maintaining a website may require the efforts of large numbers of people, it may be desirable to have website contributors work in parallel. Software configuration management systems do not allow contributors to simultaneously make changes to the same area of a website. In-progress changes may be preserved in a random manner, if at all, by individual developer systems. And, conventional systems typically do not allow individual contributors to separately test their own work without publishing to the website. The result is that individual contributors cannot foresee the effects of their contributions when combined with other contributions. As a result, conflicting changes may be posted to a website, corrupting its content and undermining the website's integrity.

Conventional systems sometimes rely on a central website control person known as a "webmaster" to integrate all changes posted to a website. This webmaster is solely responsible for the quality control of the website and for integrating all of the content. With the existence of multiple content contributors, the webmaster often becomes a bottleneck in maintaining and developing websites. Integrating the work of multiple contributors is a time consuming and labor intensive task, and includes debugging the content and resolving conflicts among contributors. To further complicate things, webmasters have no real-time control over the contribution process. This makes it difficult if not impossible for the webmaster to properly organize and maintain a website. The webmaster is left to sort through errors, to resolve conflicts and to schedule website changes after the content is delivered.

Such a system requires that information be stored in multiple locations, within many different files and within a format where the information can be easily accessed and cross referenced within the application. Conventional applications require a user to manually submit and store information into some location. If a user desires submissions or storage into multiple locations, they are usually done individually, leaving the user the extra task of deciding proper storage locations to store data, including in-progress changes, and the responsibility of manually storing the information. In either case, the deployment of information requires arduous tasks that detract from the principle purpose of the development software, developing websites.

In the field of website development and maintenance, it is of paramount importance to preserve data while a website is being developed and maintained. Many hours go into this process to produce data defining content that is displayed on a website. As a practical matter, however, system and process failures occur that threaten the integrity of the data produced and stored in the system.

Therefore, there exists a need for a system and method to more efficiently save in-progress information in the event of a process or system failure and to reduce the amount of downtime resulting from such failures. As will be seen, the invention accomplishes this in a simple and elegant manner.

SUMMARY OF THE INVENTION

The invention includes a method of and apparatus configured to enable the preservation and recovery of in-progress developments and changes as they are made in a system for development of content in the event of a process or system failure. The in-progress data developments and changes may be preserved while they are created, and may then be retrieved and recovered after the system or process is recovered. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation. The invention further includes a method of and apparatus for recovering and restarting the actual process or system after such a failure. Utilizing one or both features, an application utilizing the invention may be able to reduce the amount of data and process time lost as a result of a process or system failure.

DETAILED DESCRIPTION OF PREFERRED EMBODIMENTS

Figure 1:
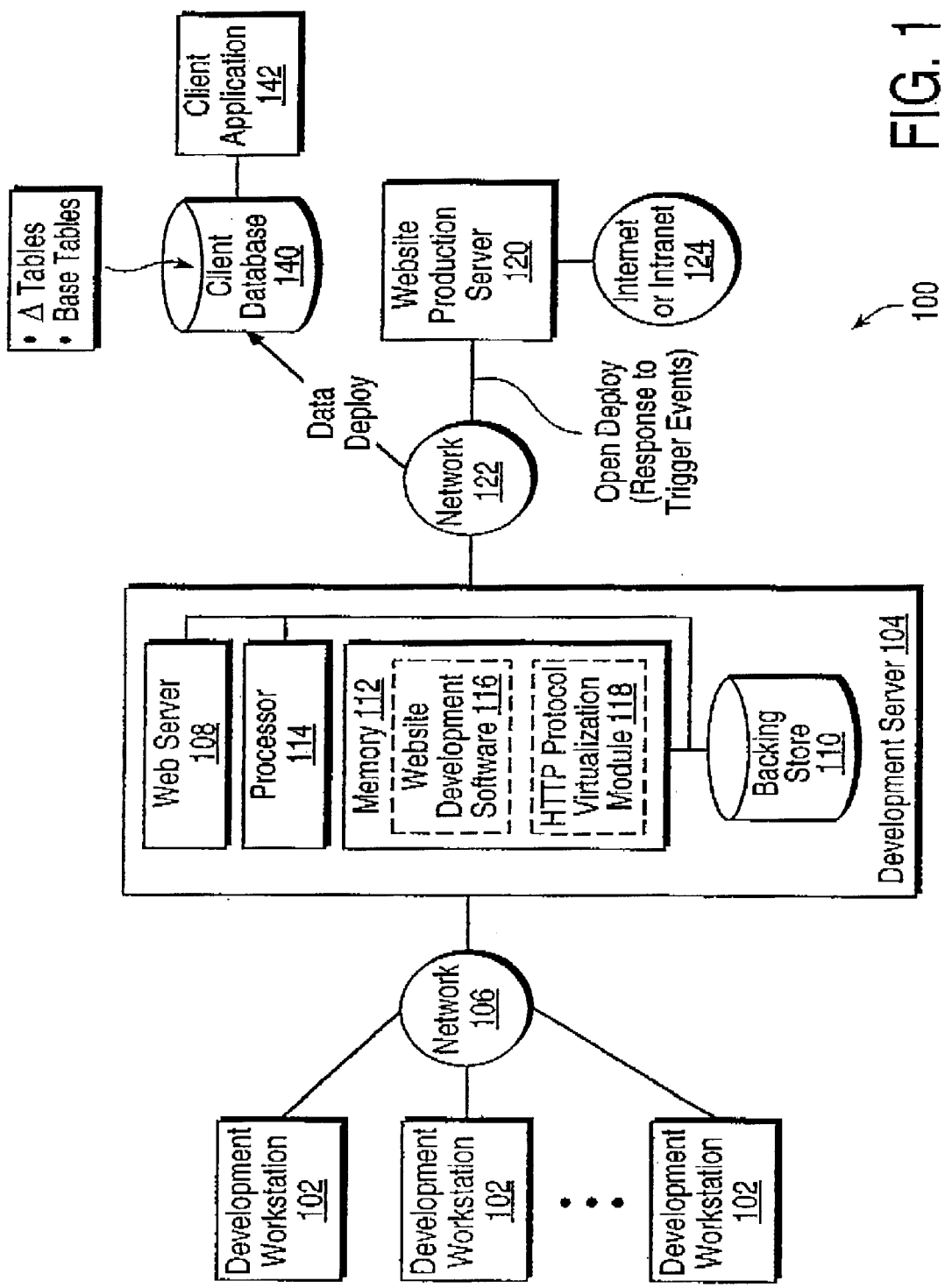
FIG. 1 illustrates a computer network system for website development in accordance with the present invention.

The invention includes a method of and apparatus for recovery of in-progress changes made in a system for development of an Internet website, intranet site or extranet site in the event of a process or system failure. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation. The invention further includes a method of and apparatus for recovering the actual process or system after such a failure. Utilizing one or both features, an application utilizing the invention will be able to reduce the amount of data and process time lost as a result of a process or system failure.

The invention is directed to a method and apparatus for efficient storage and recovery of data. A system that utilizes the invention may work in synchronicity with the application to retrieve and store in-progress data that is created, modified, relocated or otherwise changed. The retrieval and storage of the data may also be automatic, making the operations operate in the background of an application, transparent to the system operators. In one embodiment of the invention, a computer system may be configured to execute software code that defines the relevant functions for performing in-progress data retrieval and storage operations according to the invention.

One embodiment of the invention may be characterized as a record oriented data pump application that reads data content records (DCRs) from a source upon an event. The pump may be configured to trigger a retrieval action upon the occurrence of an event, a trigger event, and possibly perform a subsequent or concurrent action, depending on the type of event. For example, upon the creation or modification of data in a work area, in-progress data may be retrieved and stored to preserve the changes. This could occur in parallel with normal process operations, such as conventional periodic retrieval that occurs automatically over certain time periods. The method according to the invention may be configured to retrieve in-progress data into memory-mapped locations as it is created, possibly occurring synchronously, asynchronously, periodic, or non-periodic. Data can be stored in a cache memory as the system operates, and can simultaneously be stored in cachecache, a memory location that copies the cache memory contents. From here, data can be recovered in the event of a system or process failure.

The data pump may then store, modify, transfer, filter, or otherwise change the data or write a result to a destination according to predetermined parameters. The invention is particularly adapted to preserving data in an Internet website development software application and will be described in that context. It will be appreciated, however, that this is illustrative of only one utility of the invention, and that the invention has greater applicability and utility in applications in which the preservation of in-progress data and the reduction of downtime are necessary or useful.

In a website development application, events that relate to changes in data may take on many forms. For example, when data is created in a work area, it is important to somehow capture that data and preserve the changes in the application data associated with its creation. Other examples include transferring data to destinations, changing actual content to be displayed on a website, changing attributes of a file that may affect the use of the content within the file, and other actions that are related to content, attributes and other records and data related to the development and maintenance of websites. The invention is directed to the efficient retrieval, preservation and storage of these types of data while the creation or changes are being made in-progress. This operation may also be automatic and synchronous with the underlying application wherein the data is used.

In a computer system that manages a quantity of data, the data is stored in computer memory in the form of files. For example, in a system for maintaining and making changes to content for a website, extranet site or intranet site, physical memory may be allocated for work areas, staging areas and edition areas. Work areas may store in-progress changes to be made to the content by an individual contributor or group of contributors. Unlike conventional systems, a system embodying the invention may be configured to automatically retrieve and store these in-progress changes in a manner that is transparent to users maintaining and developing content. Once the changes are made in the work areas, the changed content may be submitted to a staging area or areas.

In the staging area, the content changes may be combined. From the staging area, the changed content may be forwarded to an edition area or other areas. The edition areas may store versions or editions of the content for the website, extranet site or intranet site. In some embodiments, in any one of these areas, in different applications, data may be developed and maintained. In such development and maintenance, in-progress data is created, changed or relocated. The preservation of this data and the ability to retrieve it is what the invention is directed to. Furthermore, upon the failure of a process or system, the invention provides a method and apparatus for recovering the failed process or system, so that the in-progress data can be recovered and the process can resume. This is especially useful in a website development system, where the development configuration has many facets and layers that are extensively interdependent. The loss of in-progress changes may have ramifications that may ripple into other areas of the system, reeking havoc in many ways. Therefore, the preservation and recoverability of such changes according to the invention is very useful, and may even be necessary.

In addition to the memory that may be allocated for the various purposes described above, a physical backing store memory may also be provided for providing persistent storage for changes and other content. By persistent, what is meant is that the contents of the backing store are preferably saved despite a shutdown or power failure occurring to the system of which the backing store is a part. In conventional systems, persistent memory is often used to save information that is used often, including data that is retrieved when a system first starts up. According to the invention, in order to preserve in-progress changes, and apparatus and method are directed to the automatic retrieval and storage of such data related to in-progress changes in a manner that is transparent to a user.

According to the invention, files in the backing store or other memory each include contents and attributes. The contents of a file include the information stored within the file. This may include, for example, the text, graphics and audio information which is to be accessible via the website, extranet site or intranet site. The attributes of a file (the attributes may also be referred to as "metadata") include information relating to the file. This may include, for example, the size of the file contents, a time stamp indicating when the file was created or when the file contents were last changed, an identification of an owner who is the contributor responsible for the file, an identification of a group to which the file or its owner belongs and permission information for restricting access to the file for performing read and write operations on the file. This information may be as critical as the actual content for work that is in-progress, which may be the product of integrating content created in one work area with content created in another area. The invention is directed to the retrieval and storage of this data in an efficient manner.

The attributes of a file are stored, such as in the backing store, in association with the content of the file. When a change is made to the file contents, both the changed version of the file contents and the version prior to the changes may be stored in the backing store. For each version of the file contents, associated attributes are also stored. Because the attributes may include the size of the file and a time stamp indicating when the file was last changed, changes in the file contents generally result in changes to the attributes. Accordingly, a different set of attributes is stored for each version of the file contents. For a system to operate optimally, these attributes must be stored continuously, automatically and synchronously with the system. The invention is directed to doing just that. Content and related metadata that is created, maintained, relocated or otherwise changed, may be preserved for later recovery by the system according to the invention.

However, when a change is made to the attributes of the file without a change to the contents of the file, the newly changed attributes may be stored, such as in the backing store, along with the prior version of the attributes. The newly changed attributes and the prior version of the attributes then share the same version of the file contents. In this way, multiple versions of attributes may be associated with a single copy of file contents. Thus, storage space in the backing store may be preserved since storage of a separate copy of the file contents in association with each version of the file attributes is avoided. A pointer may be provided, such as in the backing store, which links both the newly changed attributes and the prior attributes to the same copy of the associated file contents.

In one embodiment of the invention, a solution is configured to develop and maintain Internet websites. Throughout such a system, data may need to be stored while the website is developed and maintained. In prior art systems, a user would be required to manually store in-process data as it is created and maintained. Utilizing the invention, however, in-progress data may be automatically retrieved, stored and possibly modified according to certain parameters, transparent from the user. The in-progress data developments and changes may be preserved while they are created, and may then be retrieved and recovered after the system or process is recovered. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation.

The application wherein the invention is embodied may include staging areas wherein data is stored and presented. Referring to FIG. 1, a block diagram of such an application is shown. The website is maintained by users occupying workstations 102. The users develop particular areas within the website in work areas, which are stored separately from other areas. Once a user working within a work area has completed a task for the website, the user may submit the content to a staging area for review. The staging area is configured to hold information pertaining to areas within the website from the multiple work areas. The proposed changes to the website can be displayed at the staging area for review before they are published in the final website. Once the changes are approved at the staging area, the changes are published and the website is modified.

In order to store particular information properly, a user utilizing conventional methods typically must compile the changes created in a work area into a file and store the file in the database. Taking into account the voluminous and varied information produced in a work area, this can be an arduous task, requiring considerable time to execute. Of course, this takes precious time away from the task of producing and maintaining a website.

According to the invention, the problem of storing information is all but eliminated. Certain events occurring in the work area may be automatically saved and possibly modified, the operation of which may be transparent to the user. For example, content and related data, when originally created, may be automatically updated in order to preserve the change in the data, as well as preserve the older versions of the data. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation. This allows the user to continue on website development tasks without having to worry about and waste time with organizing and properly storing data. In its application in an actual software application, this improvement has been proven to greatly streamline the website development process.

In order to understand how one embodiment of the invention can enhance the operation of a website development and maintenance solution, it is useful to understand an example of such a solution. FIG. 1 illustrates such an example of such a system. Referring to FIG. 1, a computer network system 100 for website development is illustrated. In one or more development workstations 102, website developers may add, remove, edit and examine files for a website. Development workstations may include conventional personal computers, UNIX workstations, or other workstations that can be configured to develop content. The development workstations 102 may be connected to a development server 104 via a computer network 106, such as the Internet or LAN.

The development server 104 may include a web server 108 for serving up content to web browsers, and a backing storage 110 for storing versions of website content. The server 108 processes HTTP requests from the development stations 102 for website content (e.g., files). The website files may be physically stored in the backing store 110 which may be conventional, such as the WINDOWS NT filing system or a UNIX filing system. The backing store may serve as a central location to store all data that is created, transferred, or otherwise maintained within the system. According to the invention, storage of data may be executed transparent to the user.

The development server 104 may also include a conventional memory 112 (e.g., RAM) and a conventional processor 114, which implements the website development methods of the present invention by executing software code 116 stored in the memory 112. An HTTP protocol virtualization module 118 may be executed by the processor 114, allowing web server 108 to operate as if it were multiple servers. The module may also be stored in the memory 112. The development server 104 may be coupled to a website production web server 120 via a network 122. Network 122 may be the same network as network 106 or a different network. The web server 120 may also be coupled to the Internet or an intranet 124. When a website is ready to be posted on the World Wide Web or on an intranet, the development server 104 sends the website content to the production web server 120 which then provides Internet or intranet access to the website, depending on the system configuration.

A website is generally comprised of the contents of an arbitrary file system. The website development system 100 of the present invention may include hierarchical file systems. Each such file system of the present invention provides an environment for managing and manipulating individual files. When executed, the website development software 116 enables the management and manipulation of files. The backing storage 110 is where the files and corresponding metadata may be physically stored. Metadata is generally data that is related to work content data, and is utilized in the identification and distinction of files containing content, including the properties of such content such as version, date created, location, author, etc. Some examples include for example content owner identification, group identification, access control, file name, modification times, creation times, extended attributes (EAs), website addresses associated with the content, and other information related to the content.

A hierarchical file system of the present invention may be referred to in the art as an "area." There may be different types of areas including work areas, staging areas and edition areas. A work area may be a modifiable file system that is used by persons who create and maintain web content in work files for eventual use in a website. It is in these work areas in particular where in-progress changes need to be preserved for later use, especially in the event of a process or system failure. A staging area may be an area where content from these work files is assembled before it is published. A central control person, such as a webmaster, may edit content submitted from work areas within a staging area or an edition area. Since the work areas are generally areas for creating and maintaining content exclusively, the staging and edition areas may be restricted to only assembling and displaying content. By design then, they may be configured as read-only file systems. Any modifications to content may then possibly need to be sent from an editor back to a workstation to perform any changes that may be needed. This helps to maintain the integrity of the content and to simplify the process. However, a business may want the system 100 to be more flexible, allowing other people such as editors to modify the content before it is published. The staging and edition areas may then be configured as modifiable file systems. In either case, the automatic storage and possibly modification of data upon the occurrence of certain events may be desired in order to preserve data produced or otherwise modified during development or maintenance of a website. This way, different versions of content may be preserved and time-stamped, allowing developers and possible editors and administrators the ability to revert back to different versions of the content.

For example, content may be submitted to a staging area for review. Upon the occurrence of the submission of data, metadata associated with such content may be modified in order to distinguish the changes made from the original version. This way, different versions may be preserved and organized. To save space, only the deltas, or actual changes may be stored from each version. This can be useful in the day-to-day operations of a website. For example, an airline may advertise different fares online, to which purchasers may order tickets for flights. An error in publishing a fare may occur, such as a fare that is much lower than planned, giving purchasers a windfall. A website administrator may then revert back to the earlier website, and avoid losing money by selling too many low fares. Having older versions of content, therefore, may be crucial to certain businesses.

A work area may initially include a virtual copy of an entire website, unless there is no existing website, in which case the work area may be empty. In other words, a work area may initially have the same contents as the file system designated for the website. A work area provides a developer's personal view of a website in which the developer may contribute to the website. For example, in a work area, developers can freely add, delete and modify website content and see how their changes fit into the context of the entire website. Changes made by developers in work areas preferably do not affect the website or the work of other contributors in other work areas. This is because each work area may be configured as a separate file system. Typically, a work area is located at one or more workstations 102.

Developers may integrate their work in a staging area by submitting the contents of their work areas into a staging area. This action is referred to as an internal deployment, or simply as a submit, where data is transferred to a backing store, which contains file versions of web content. The staging area is a file system available to multiple developers that provides a shared view of the website. Thus, a staging area may hold the collective work of several developers' work areas and may allow the developers to share and integrate their changes. In a staging area, the developers can see how their changes fit together. The staging area is typically located at the development server 104. According to one embodiment of the invention, prior to submission of the content from a work area to a staging area, in-progress changes to content related attributes might be automatically stored, and even modified to upon such an event in order to preserve versions of content. This operation may be executed transparently to the user, working in synchronicity with the development system.

Copying is said to be "virtual" where areas share directory trees, but are configured such that the directory trees do not need to be physically copied. In operation of the software application, the collective work in a staging area changes as different contributors submit new content from work areas. Work areas are most effective when the content and other information in the staging area is virtually copied back to one or more private work areas. This helps to keep the individual work areas up-to-date with respect to the staging area while contributors are performing website related tasks such as creating and maintaining content.

When the collective work in a staging area is deemed final, its contents can be published to create an edition of the website. According to the invention, deployment may occur upon certain events, which may be followed by the storage of either content or metadata. The retrieval and preservation of this data may be done automatically, and synchronously according to the invention. This may be accomplished by virtually copying contents of a staging area onto an edition area. Because an edition is typically a read-only file system, it is a frozen snapshot of the content of the entire website. Each edition taken at sequential points in the development of a web site may be archived and accessible to all developers so that developers may instantly recall files, entire directories, or reconstruct entire past versions of the website. For example, the contents of an edition may be virtually copied into a work area to be used as a basis for further development of the website. An edition area is typically located in the production server 120. The invention provides for the retrieval and storage of in-progress changes of this data so that virtual copies of information will be available for workstations in the event of a process or system failure.

So that the website development and maintenance work progresses in a predictable and orderly fashion, tasks are assigned and performed in accordance with a workflow, also known in the industry as a "job". The workflow configuration, or job, is a calculated arrangement of tasks to be performed. The arrangement may include tasks performed in serial order, in parallel with each other or in combinations of serial and parallel operation. A workflow model is a general workflow configuration that can be used repeatedly. Each workflow model describes a process that can include user tasks as well as a wide variety of automated tasks. Workflow models are typically designed by business managers and configured by a system administrator. The present invention provides the ability to enable a workflow configuration to be organized and managed according to the criteria established within the system. One embodiment of the invention is directed to the preservation of in-progress changes of different versions of the content according to associated metadata and attributes that are associated with the file containing the content.

Figure 2:
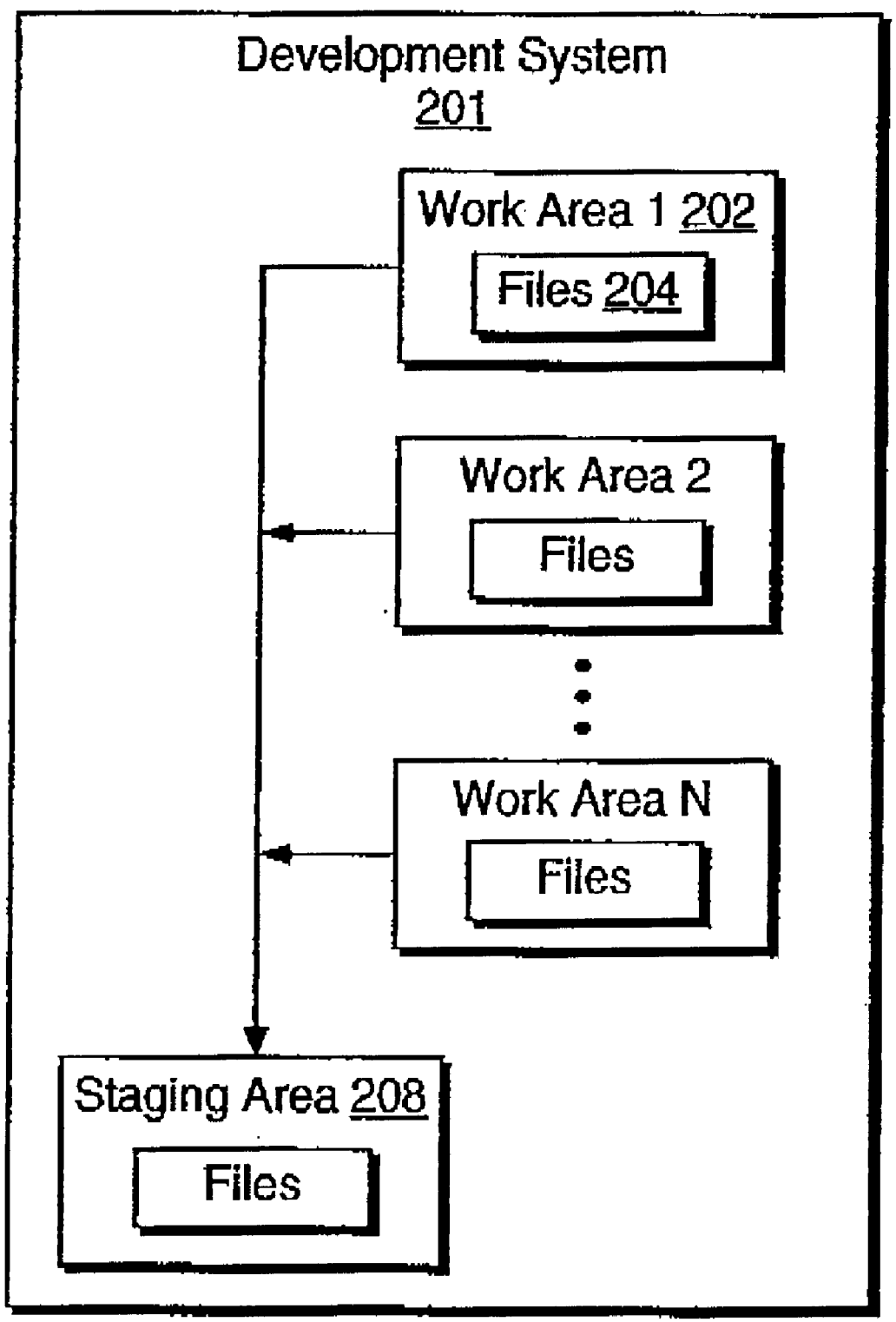
FIG. 2 illustrates a development system in accordance with the present invention.

Referring to FIG. 2, a general block diagram of a website development system is illustrated in terms and figures related to locations where files are created and maintained. These files are created and maintained in different ways to accomplish certain results related to the development and maintenance of websites. As will be seen, the manner of storage and transmission of website content, attributes of a file containing content, and other data can be crucial to efficient and convenient development and maintenance of a website. The invention is directed to a method and apparatus for accomplishing just that by facilitating the useful presentation of data by storing in-progress changes of different versions of content automatically and in synchronously with the development and maintenance application. In the system illustrated in FIG. 2, a first work area 202 includes memory for temporarily storing files 204. The files 204 define the portion of the website to which the user of the work area 202 is contributing as well as the changes the user is making. The files may include content and file attributes related to such contributions.

In operation, a user in work area 202 may download a file or files containing some or all of the current data appearing on a website. This data file may include content, metadata, extended attributes and other data related to contend. The content is the work product of the user in a work area, and metadata is information related to the content that defines its use and gives the system the ability to categorize the content according to its intended use. An extended attribute is information attached to a file that is representative of information contained in the file. Utilizing this data, the system may track, store and organize versions of content according to different parameters, such as creation dates, locations of websites, locations of work areas, previous deployment dates and other information. Preserving in-progress changes of this data automatically according to certain events, a development application can perform work on content both automatically and transparent to the user. The downloaded file or files may be considered a type of "snapshot" of the website as it exists at a particular time. The user of work area 202 may then perform one or more tasks which result in changes to the website snapshot. According to the invention, the changes with respect to the snapshot may be automatically recorded in the backing store as changes are made by a developer working in a workstation. The in-progress data developments and changes may be preserved while they are created, and may then be retrieved and recovered after the system or process is recovered. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation.

Figure 3:
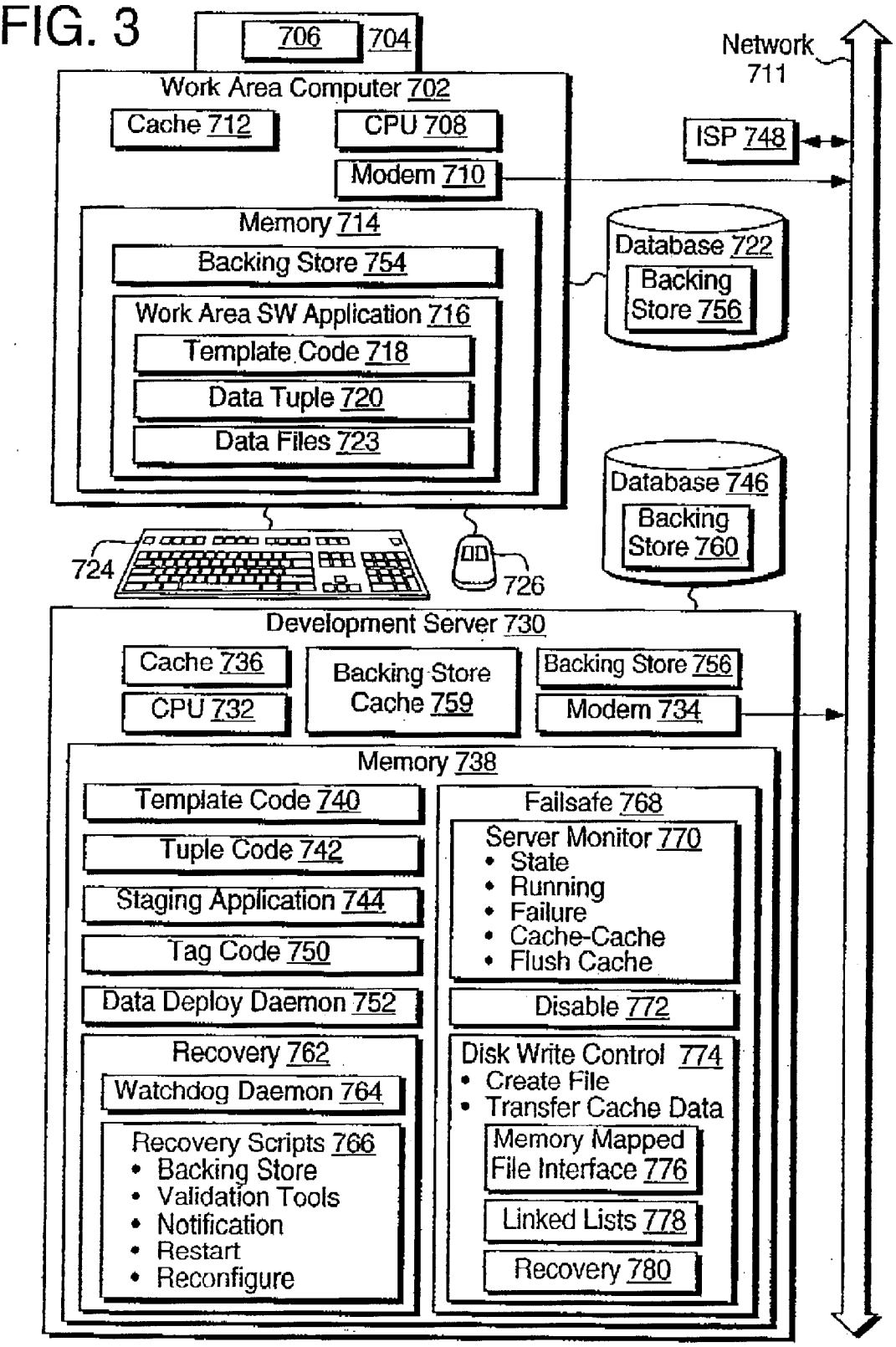
FIG. 3 illustrates a work area computer and development server in accordance with the present invention.

Referring to FIG. 3, a block diagram of a system employing a deployment application as well the Failsafe (tm) and Recovery applications in accordance with the invention is illustrated. Such a deployment application is discussed in connection with a website development and maintenance solution as discussed above. The system includes a work area computer 702 connected to a monitor 704, which has a display 706 for displaying data to a user. The work area computer 702 includes a CPU 708 for controlling the inter-workings of the computer and a modem 710 connected to a network 711 for sending information to other destinations. The work area computer 702 further includes cache 712 for storing frequently used data. Memory 714, controlled by CPU 708, can be a conventional memory and can be a random access memory (RAM), a dynamic random access memory (DRAM), a static random access memory (SRAM), or any other memory configured to store and transfer digital data therefrom. The work area may also be defined as a collection of directories located on the development server, thus, not a separate computer in and of itself. Thus a work area may be defined merely as a set of files that a user at a development computer has authority for access.

If on a separate computer, it will be apparent that the computer 702 is conventional and that various modifications may be made to it. Memory 714 includes work area software application 716 that includes template codes for creating and storing templates used for displaying data. These templates define the displays used on the website, so that a user having a graphic user interface (GUI) can read the data displayed in the selected template format. Also stored in the memory 714 is data tuple code 720 for storing and transferring data in the tuple format. Also communicating with work area computer 702 is an optional database 722 for storing data that is easily accessed by a user. Data can optionally be stored in data files 723, which gives a user an organized way to store data. Work area computer 702 also includes a keyboard 724 and mouse 726 that allow a user to input data.

The website building system of FIG. 3 further includes a development server 730 having a CPU 732 for controlling the inter-workings of the server 730 and a modem 734 connected to network 712 for transferring data using the network 712. The server 730 further includes a cache memory 736 for storing frequently used data and a conventional memory 738. Thus, it will be apparent that the server 730 is a conventional server and that various modifications may be made to it. The in-progress data developments and changes may be preserved while they are created, and may then be retrieved and recovered after the system or process is recovered. In one embodiment, the cache memory contents are mirrored into a memory-mapped file, providing a redundant location for cache data. In the event of a failure, the mirrored cache information from cache 712 or cache 736 is available for recovery from a file. This cache 736 may reside in software in the memory 738 as well. This extra cache location can be filled and flushed as needed by the system as the cache data is stored to disk or other memory location, obviating its preservation. Memory 738 may include template code 740 for storing and creating templates to be used on a website. The server 730 may further include tuple code 742 for storing and transferring data in a tuple format. Tuple code may be a software application configured to deploy data. Further included is a staging application 744 for staging contributions to the website by multiple work areas. The staging application 744 can configure the template code and tuple code for displaying data on a website in a given template format. Also included is an optional database 746 for storing data to be accessed by the website server 732. ISP 748 may also be included in the system of FIG. 3 to allow the work area computer 702 and server 730 to exchange data via the Internet, another example of network 711. The data deploy daemon 752 may be a software application that is configured to deploy data.

One embodiment of the invention is a method of and apparatus for recovery of in-progress changes made in a system for development of an Internet website, intranet site or extranet site in the event of a power failure. Still referring to FIG. 3, such a system is embodied in the Failsafe (tm) and Recovery applications. The Failsafe (tm) mechanism is configured to preserve data that may otherwise be lost in a system or process failure. The Recovery mechanism is configured to prevent or reduce system or process downtime under certain circumstances. Together, these two applications allow a system such as a website development and maintenance system to reduce the amount of lost data and down time.

Backing Store memory 754 may be included in the work area memory 714 for storing in-progress changes made while a user develops and maintains websites. According to the invention, the backing store is configured to store such changes dynamically as they are made, providing data saving even before conventional automatic saving of data occurs. Backing store 756 may reside in database 722 as an alternative location, performing similar functions. Alternatively or concurrently, backing store 758 may reside in server 730. As yet another alternative, backing store 760 may reside in database 746. In either location, the backing store may be configured to store in-progress data developed or maintained in work area computer 702 or in other work area computers.

In one embodiment of the invention, Recovery application 762 resides and is stored in website server memory 738. The recovery code includes watchdog daemon 764, which is an application configured to monitor servers, such as the server 730, when such code is executed by CPU 732. The monitoring may include keeping track of whether certain processes are up and running in the server. Upon their failure or upon other circumstances, the watchdog monitor may activate certain functions in the recovery application to recover the process. The monitoring may also include the tracking of the actual server functions, such as power failures and other system failures.

Upon the occurrence of such events, recovery scripts 766 may be invoked to recover the system processes or other failed mechanisms. The backing store may be recovered by retrieving Failsafe (tm) files (discussed below), which contain in-progress changes made in the work area, and may include changes made before the system was able to recover the changes using conventional automatic saving methods. In conventional systems, automatic methods are invoked periodically in order to occasionally capture and maintain data changes as they occur in their development and maintenance. According to the invention, data may be captured and preserved even before the conventional storage mechanism.

The recovery scripts 766 may also invoke certain validation tools to validate data saved and transmitted within the system. Such tools may determine whether recovered data is valid in the system. This validation of the data may help in determining whether recovered data should be stored and utilized by the system.

The recovery scripts may also invoke a notification application in the event of a process or system failure. The notification scripts may be configured to send predetermined notifications to individuals or applications, which may also be predetermined. Such notification could be in the form of an email or other notification to certain individuals or other applications, indicating the event of a failure.

The recovery scripts may also include restart scripts. These restart scripts may include the ability to restart a process, such as a website development and maintenance application. The recovery scripts may include the resetting or otherwise reconfiguration of an application so that it may resume operation. These restart scripts may also include the ability to restart a system, such as sever 730, after a power or other system failure, such as a kernel failure. The recovery scripts may include the resetting or otherwise reconfiguration of a server so that it may too resume operation.

Recovery scripts may also include reconfigure scripts for reconfiguring a process or system after a failure. The recovery scripts may include the ability to recover lost data after such failures. Recovery scripts may also enable a system to recover the overall operation of an application process or system, and may further enable such a system to fully recover any in-progress changes made in an application.

Still referring to FIG. 3, memory 738 may also include Failsafe (tm) application 768, configured to reduce the loss of data in the event of a system or process failure. The Failsafe (tm) may include server monitor 770, configured to monitor the operations of the website server. The monitor is configured to track the state of the server, including whether the server is running, whether it has failed, and other states in which the server may be operating. Failsafe TM may also be configured to monitor a secondary cache memory, or cachecache TM. Cachecache may be an area of memory designated for storage, or it may be a separate memory module in and of itself. In either configuration, the cachecache may act as a cache memory for the system, even the system cache itself, to preserve in-progress changes made in the work area, or possibly in other areas. In one embodiment, the cache memory contents are mirrored into a memory-mapped file, providing a redundant location for cache data. In the event of a failure, the mirrored cache information is available for recovery from a file. This extra cache location can be filled and flushed as needed by the system as the cache data is stored to disk or other memory location, obviating its preservation.

Under certain circumstances, it may be important to flush the cachecache. For example, metadata may be preserved in the cachecache as in-progress changes. There may be errors in the metadata, the metadata may be outdated, or may be somehow inconsistent with other related data in the backing store or in other areas. According to the invention, the CPU may then execute flush cache code in order to flush out any unnecessary or harmful code residing in the cachecache. It also may be useful in some applications not to flush the cachecache. For such applications, disable code 772 may be executed to avoid such flushing in an application.

According to the invention, Failsafe may also include disk write control 774, which is configured to control and manage the writing of information from the cachecache to the disk or other memory location. The write control may be configured to create files in a destination location, and to transfer cache data to the location. This way, when Failsafe is invoked, data may be written to a destination to recapture and utilize the recovered in-progress changes from an area.

In another embodiment of the invention, a memory mapped file interface 776 may be included to map recovered cachecache data to a file. Failsafe may also include memory of linked lists 778, which are used in the recovery functions 780 of Failsafe. These are discussed in more detail below in connection with the data recovery function illustrated in connection with FIG. 8.

Figure 4:
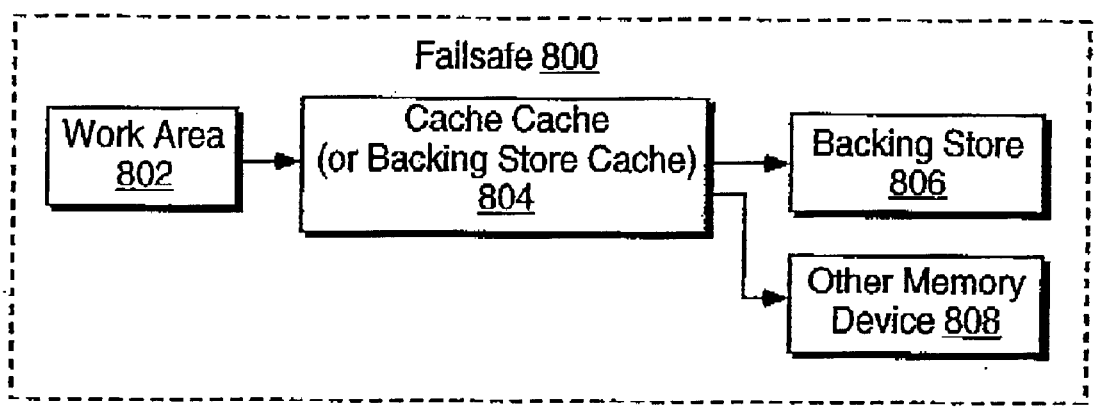
FIG. 4 illustrates a block schematic diagram of elements used in a Failsafe technique for preserving in-progress data in accordance with the present invention.

Referring to FIG. 4, a more high-level block diagram of an embodiment of Failsafe 800 is illustrated. Work area 802 may be configured to create and maintain content, whether it be website content for creating and maintaining websites or other applications. In operation of the invention, cachecache 804, which may be a cache memory associated with the backing store, is configured to store in-progress creation of content, changes to existing content and metadata, such as file attributes, from the work area as such changes are made. Upon the occurrence of certain events, such as a process or system failure, data stored in the cachecache may be transferred to the backing store 806, or another memory device 808. In either type of device, one purpose is to save in-progress changes from the work are that may not be preserved by conventional methods that may be employed in certain applications.

Figure 5:
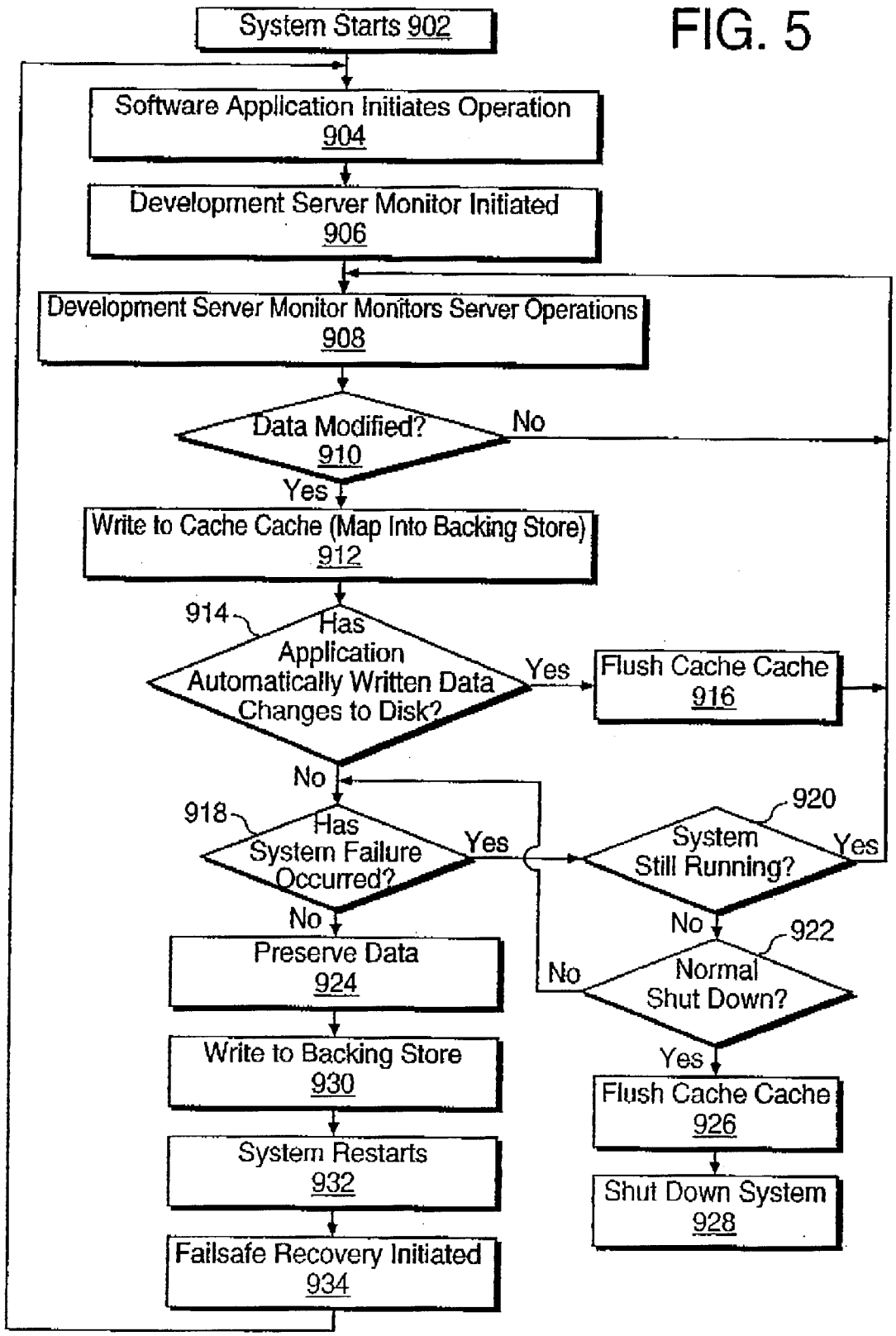
FIG. 5 illustrates a flow diagram for operation of the Failsafe technique in accordance with the present invention.

Referring to FIG. 5, the operation of one embodiment of and application employing Failsafe according to the invention is illustrated. The application may be a word processing application, a website development and maintenance application, or any other application where it is useful to preserve in-progress changes of content or metadata. Such a feature would save lost data and downtime in a system running such an application. In step 902, the system starts up in normal operation. In step 904, the software application initiates its operation. In step 906, a development server monitor initiates its operation, which may entail the creating of a monitoring thread to the server to monitor the server operations. In step 908, the websever monitor commences monitoring the operations of the server, detecting whether and when any data has been modified in the application. Using the monitoring thread, the monitor may determine whether or not any data has been modified in the application in step 910. If no data has been modified, the process returns to step 908, where the monitoring of the system continues. In contrast, if data has been modified, the process proceeds to step 912, where data is written to the cachecache. In another embodiment, data may be mapped to the backing store using a memory mapped file interface.

It may be an advantage in some applications to remove cachecache data from the cachecache once data has been written to memory by the system. This may avoid the occurrence of using outdated or otherwise useless data. In this situation, preservation of the data is not necessary, for it is preserved on a disk or other safe place. In one embodiment of the invention, once the application has written data related to changes in content or other data, the cachecache may be flushed in step 916.

The operation of Failsafe may also monitor whether a system failure may have occurred in step 918. Such a failure may be the result of a hardware failure, or a software failure. The failure may also be a process failure that may occur internally to the system. If no system failure has occurred, the process then progresses to step 920 where it is determined whether the system is still running. If it is still running, then the process may detect that the error is false and return to monitoring the system in step 908. If the system is not running, then the process proceeds to step 922 to determine whether a normal shut down has been initiated, where the preservation of in-progress data changes may not be necessary. If a normal shut down has occurred, then the data in the cachecache may not be necessary, so the cachecache is flushed out in step 926, and the system is shut down in step 928.

If, however, the server monitor determines at step 922 that a normal shut down has not occurred, then the process may return back to step 918 to determine whether a system failure has occurred. Returning to step 918, if a system failure occurs, the invention directs the process to preserve the data in step 924 and then to write to the backing store in step 930. This step takes the preserved data from the cachecache to the backing store once such a failure is detected. The preserved in process data changes may then be utilized. This is in contrast to prior art systems, in which data would be lost in such circumstances.

Once the system restarts in step 932, Failsafe recovery may be initiated instep 934 to recover the in-progress data. In this step, the data written from the cachecache to the backing store in step 930 may be recovered and utilized by the system. Thus, the process of saving and recovering in process changes to data in a software application has been described in full circle. The process may then return back to step 904, where the software application restarts after the system restarts, beginning the process all over again.

Figure 6:
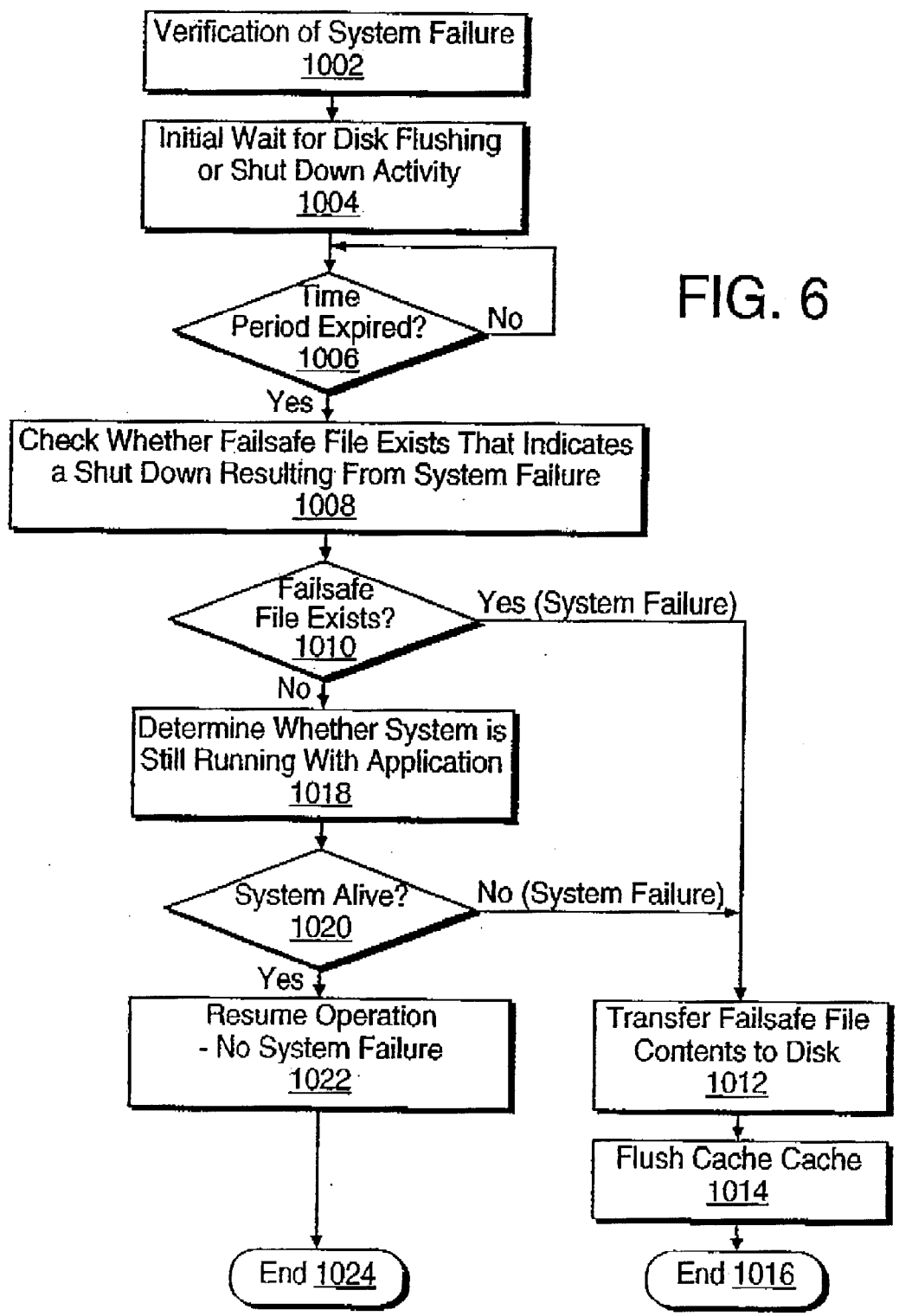
FIG. 6 illustrates a flow diagram for verifying whether a system failure has truly occurred in accordance with the present invention.

Referring to FIG. 6, a process for verifying whether a system failure has truly occurred is illustrated in a system flow diagram. Such a process may be invoked in a process such as that described in connection with FIG. 5, and in particular at step 918. The verification of the system failure begins at step 1002, then proceeds to step 1004, where there is an initial waiting period. This waiting period is to allow enough time that is sufficient for a disk or cache flushing to occur, or for a shut down activity to occur. Such operations may indicate that a system failure has not occurred, despite whether any monitoring thread may have indicated that some type of system abnormality has occurred. One of these other events have occurred, the system may then be satisfied that a system failure has in fact not occurred, and proceed to the next step. Once a time period has expired by the timing loop in step 1006, the process proceeds to step 1008, where it is queried whether a Failsafe file exists. In on embodiment of the invention, the mere existence of a Failsafe file may indicate that in fact a shut down has occurred as a result of a system or process failure. In step 1010, such a query is made. If a Failsafe file exists, it is an indication that a system or process failure has occurred. In such a case, the process proceeds to step 1012, where the contents of the Failsafe file are transferred to a disk or other memory location. Following the transfer, the cachecache may be flushed in step 1014, so that other in-progress data may be stored therein. The process may then end at step 1016, or proceed to steps following step 918 of FIG. 5. Referring back to step 1010, if no Failsafe file exists, then there may be one last check to we whether the system is still running with the application in step 1018. This is accomplished by querying in step 1020 whether the system is still alive. If the answer is no, then this may indicate that a system or process failure has occurred. Similar to that described above, the process then may proceed to step 1012 to transfer the Failsafe file contents to disk or other memory device, followed by flushing the cachecache. If, however, the system is determined in step 1020 to still be alive, and no system failure is indicated, the process proceeds to step 1022, where system or process operation resumes, and to step 1024 where this particular process ends.

Figure 7:
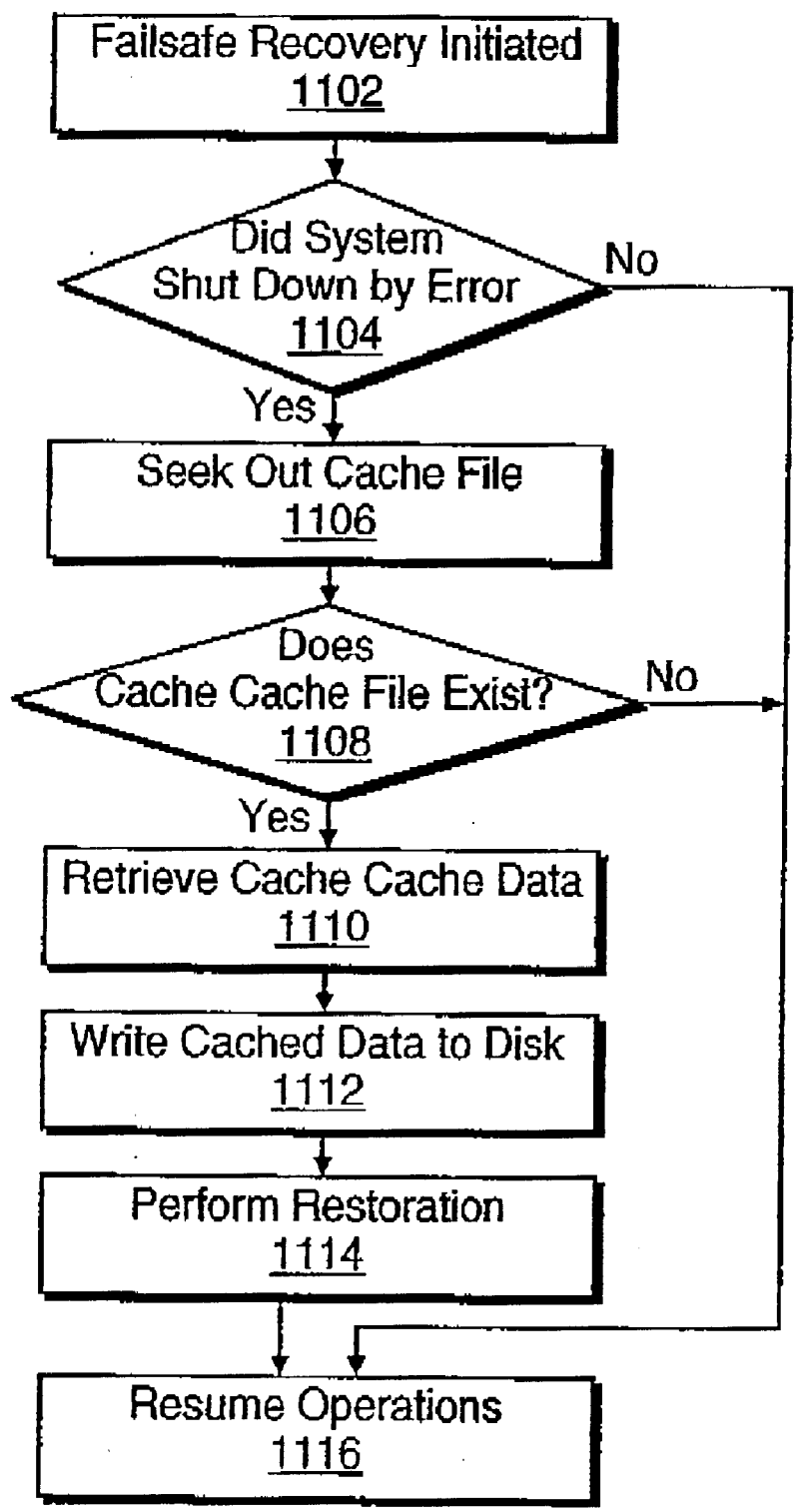
FIG. 7 illustrates a flow diagram for performing recovery of in-progress data in accordance with the present invention.

Referring to FIG. 7, a process for Failsafe recovery is initiated in step 1102. This step may correspond with step 934 of FIG. 5, which is initiated after the restarting of the system after a failure has occurred. In step 1104, a query is done to determine whether the system was shut down due to an error. If it is determined that the system was in fact not shut down by error, then the process proceeds to step 1116, where normal operations resume. If, however, the system did in fact shut down as a result of a system or process error, then a cache file is sought out in step 1106. Then a determination is made whether a cachecache file exists in step 1108. This determination may be made by exhausting all areas that may be searched for a file. It may also be made by searching out for certain flags that identify such a file, or by other means that might identify such a file in a system. In either case, if no such file exists, then there is no data to recover and the process may proceed to step 1116 to resume system or process operations. If, however, a cachecache file does exist, then the process proceeds to step 1110, where cachecache data is retrieved from such a file or data location. The data may then be written to disk or other location in step 1112. Restoration may then be performed in step 1114, where the content or file attributes are restored. This may be done by restoring the in-progress changes that existed before the system was shut down, and was preserved and subsequently retrieved in this recovery process. The process or system may then resume operations in step 1116 with the restored data.

The process of writing to the backing store may occur relatively slowly and may require significant system resources in comparison to writing to the work area memory. Thus, changes stored in the work area memory may be periodically submitted to the backing store memory. In the event of a power failure, it is desired to recover changes stored in the work area memory that had not yet been stored by the backing store memory and to write those changes to the backing store.

In one embodiment of Failsafe, upon power-up of a system for Internet website, intranet site or extranet site development, a power-fail flag is set. Upon a normal power-down of the system, the flag is reset. In addition, upon a normal power-down of the system, contents of the work area memory are written to the backing store. However, upon an abnormal power-down, such as in the event of a power failure, the flag is not reset. Typically, upon an abnormal power-down of the system, changes stored in the work area memory may not have been stored in the backing store.

Upon a next power-up of the system, the power-fail flag indicates whether a normal power-down occurred. Thus, the power fail flag is examined upon each power-up of the system. If the flag indicates that a power failure occurred, this indicates that recovery of changes from the work area memory is to be performed.

This program recovers data stored in the work are memory that had not been written to the backing store memory prior to a power failure. Thus, upon power-up of the system, if the power fail flag is determined to have been set, failsafe is run prior to resuming normal operation of the system. Resumption of normal operation of the system is accomplished by running a software program referred to herein as the server.

Failsafe ™ may be run before the webserver is re-started. Its job is to write the information that was contained in the backing cache at the time of server or system failure. "Points" is a term of art used in reference to Unix-based systems. It represents a file entity, such as, for example, a file, a branch or a directory. These entities change as they are modified or otherwise worked on by software applications in the work area. Once a point is in some way changed and prior to its being written to the backing store memory, its becomes what is referred to herein as a "dirty point." Once a dirty point is written to the backing store memory, the point becomes what is referred to herein as a "clean point." Thus, an object of the failsafe program is to convert dirty points that were left after a power failure into clean points.

Figure 8:
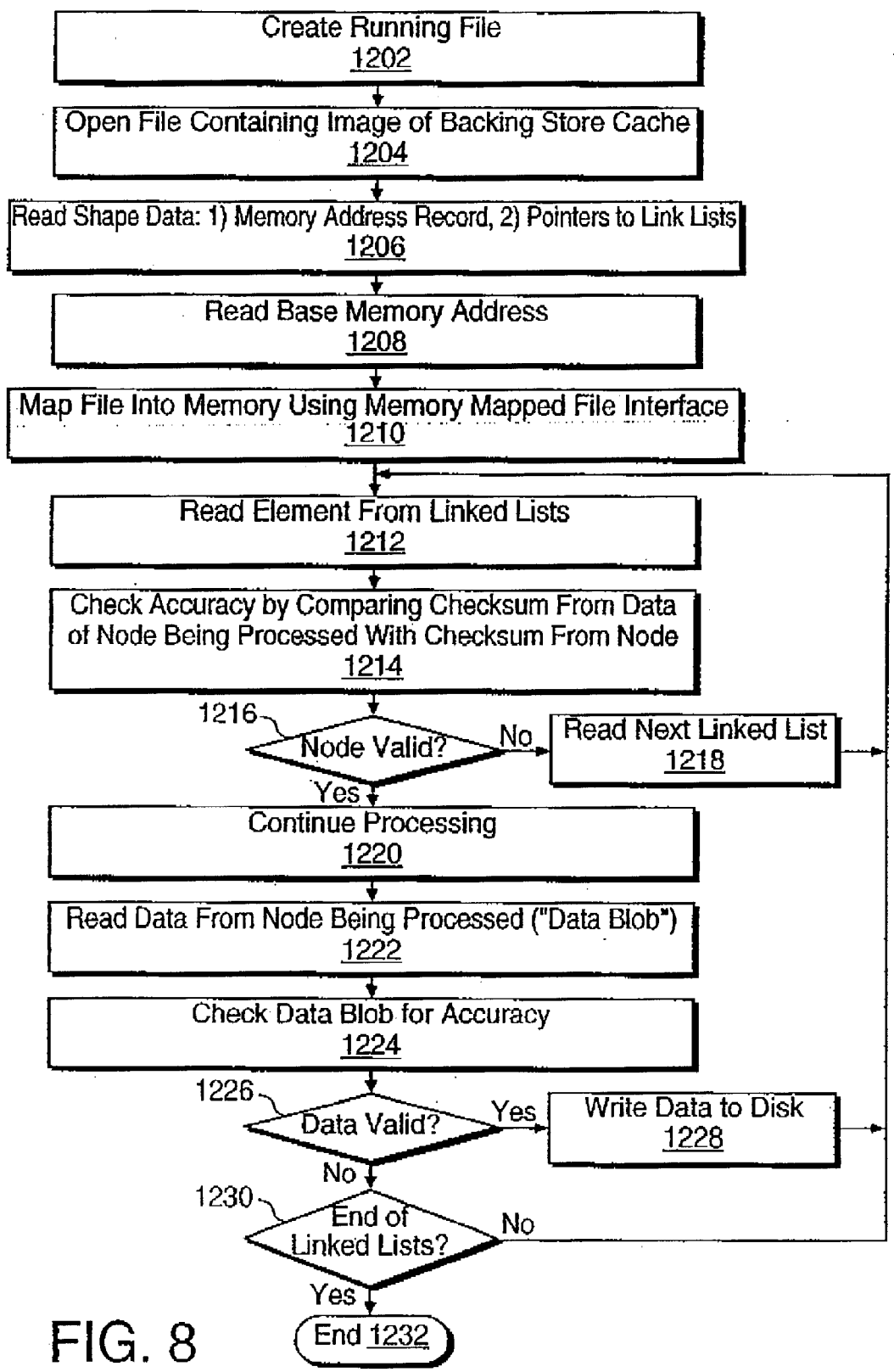
FIG. 8 illustrates a flow diagram for an alternate embodiment of operation of the Failsafe technique in accordance with the present invention.

Referring to FIG. 8, another embodiment the Failsafe (tm) application according to the invention is illustrated in the form of another flow diagram. In the first step 1202, a running file may be created for storing in-progress changes for an application. Such a file is preferably stored in the cachecache, where in-progress changes are preserved in the event of a system or process failure or abnormal shut down. In step 1204, a file may be opened containing the image of the backing store cache. This backing store cache may be the cachecache, or area where in-progress changes are stored from an application. Data is then read from the file in step 1206. The first 4096 or so bytes of this file may be read using normal read and write system calls. According to the invention, the first block of the file contains information pertaining to the "shape" of the data contained in the memory image. Such a file may contain a record of the memory address at which the memory image of the data existed while in the context of the server process (base memory address), and pointers (memory addresses) that indicate the beginning of the two linked lists for the dirty points from the file system and workflow caches. In step 1208, the process may then read the base memory address and map the file into memory in step 1210 using the operating system's memory mapped file interface. The image now contained in the file has the same "shape" as it had while being run in the context of the server process. From this point on it is possible to treat the image contained in the file as if it were still in the server process. In particular it is possible to de-reference the pointers that form the linked list without causing a memory reference error.

In the next step 1212, the system may read the next element of the linked list and check the element for accuracy in sep 1214. This may be done by comparing a checksum from the data of node being processed with the checksum of another node. Next it is queried whether the need is valid. If not valid, then the next linked list is read. If the next element is the end of the list, the process returns to step 1212 to repeat the process after the next link list is read in step 1218. An element of the linked list may contain one of a pointer to the next element of the list, a pointer to the associated data, a record of the numerical ID of the point that is represented by this element and a checksum for the data contained in this node. If the node is indeed valid, then processing is then continued in step 1220. Accuracy checking involves generating a new checksum from the data contained in the node currently being processed and comparing it with the checksum read from that node. The node is considered to be valid if it both checksums are equal.

In the next step 1222, data is read that is referenced by the node currently being processed, where the portion of the data may be referred to as a "data blob", and is checked for accuracy in step 1224. A blob may contain a checksum of the data contained in the blob, a pointer to the data contained in the blob, or an indication of the size of the data contained in the blob. It is then determined whether the blob is valid in step 1226. Accuracy checking involves generating a new checksum from the data contained in the blob currently being processed and comparing it with the checksum read from that blob. The blob is considered to be valid if it both checksums are equal. If the blob is valid, then the system writes the data to disk in step 1228. In one embodiment, the system may repeat the above steps for the data in a second linked list. If the end of the linked lists have not been reached yet, then the process proceeds to step 1212 to repeat the steps. Processing may stop once the end of the list is reached, proceeding to step 1232.

In one preferred embodiment, error recovery steps may be taken if step 1216 fails. In particular, the validity of the pointer to the next element in the list can be checked for accuracy. If the pointer lies in between the beginning of the memory mapped image and the end of the memory mapped image an attempt can be made to de-reference the pointer and continue processing with the next node.

A more complex error recovery scheme would be to include a "signature" for each element in the list and each blob. If all else fails in this case, the file could be read looking for these signatures and if one is found the resulting data item could be checked for accuracy and processed if it is valid. The general practice is to denote the end of the list with a memory address of 0, which is considered to be an invalid memory address on most systems.

In the implementation described above each element of the linked list has a second pointer associated with it. This pointer refers to the "blob" of data associated with the point is represented by the node in the linked list. Different data structures may be used to record information about a point. In one embodiment, a B-Tree would provide a useful lookup performance than a list, but insertion costs may be higher.

Figure 9:
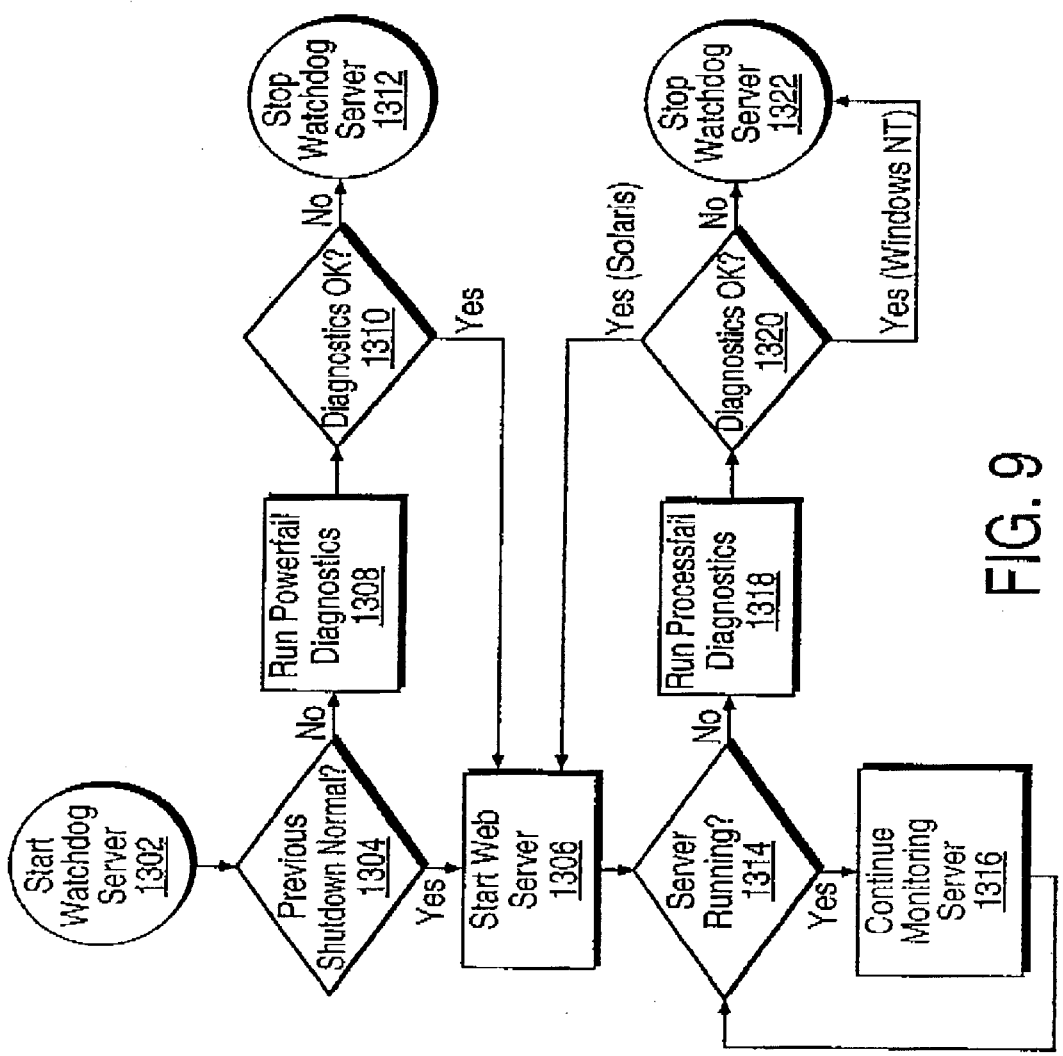
FIG. 9 illustrates a flow diagram for operation of a system recovery technique in accordance with the present invention.

Another embodiment of the invention involves the ability to reduce downtime in a server after a system or process failure. Recovery 762, as discussed above in connection with FIG. 3, may be configured as a software application that, when executed by a CPU, is able to perform certain actions to recover the process or system operations. Recovery may be configured as a watchdog daemon, which can enable a server to be monitored for process or system failures. Recovery may then respond to such failures by performing certain functions. Where Failsafe, discussed above, may be configured to preserve and recover in-progress data following process or system failures, Recovery may act to recover the actual system or process following such a failure. Referring to FIG. 9, a flow chart illustrating the operation of such a system is illustrated.

The process begins at step 1302, where the watchdog daemon is initiated and begins operation. The daemon may be a separate server, or may be an application running on the server where the process software application (e.g., a website development and maintenance application) is running. In either configuration, Recovery includes a watchdog daemon configured to monitor the server operations to detect system or process failures. After an initial start up, it may be useful to determine whether a previous shutdown was a normal shutdown, as is done in step 1304. This operation may be the first operation performed by the system, even before the server is started in step 1306. This way, the sever may be monitored from its initial startup. If it is determined that the previous shutdown was normal, then the server may be started in step 1306, and monitoring can continue while it runs.

If, however, it is determined that the previous shutdown was not normal, such as, for example, when a process or system failure occurs, then powerfail diagnostics are run in step 1310. The powerfail diagnostics may be configured to examine whether any processes or systems have any residual defects that may render such processes or systems inoperable or otherwise defective. Such a procedure may be akin to that discussed above in connection with FIG. 6, where there is a verification of whether a system failure actually occurred. If the diagnostics do not check out, then the watchdog server is stopped in step 1312. At this point, failure messages or other notifications may be generated to indicate the failure. Such notices may include system wide notices that such a failure has occurred, or messages to be sent to certain personnel who would be responsible for response to such failures.

If the diagnostics check out, then the server may be started in step 1306. Next, whether the process proceeds from step 1304 or 1310, the server is still watched by the watchdog server or daemon queries whether the server is running in step 1314. So long as it is running, the watchdog daemon will monitor the server. If it is determined in step 1314 that the server is running, then the watchdog daemon continues to monitor the server in step 1316, possibly querying over and over whether the server is still running. If the watchdog daemon determines that the server is no longer running, then the process proceeds to step 1318 to run processfail diagnostics. This step determines whether any processes or systems have any residual defects that may render such processes or systems inoperable or otherwise defective. Such a procedure may be akin to that discussed above in connection with FIG. 6, where there is a verification of whether a system failure actually occurred. If the diagnostics check out, then the step that follows may depend on type of serer platform that is operating. If the system is Solaris TM, then the process may proceed to step 1306, and the server is started again. If the system is a WindowsNT system, then the process may stop the watchdog sever or daemon at step 1322. In either system, the if the diagnostics do not check out, then the process proceeds to step 1322 to stop the watchdog server or daemon. Other diagnostics may also be performed in such a watchdog system, and may vary according to any one application. The invention, however, is not limited to any such varied diagnostics, and includes other equivalent variations.

Figure 10:
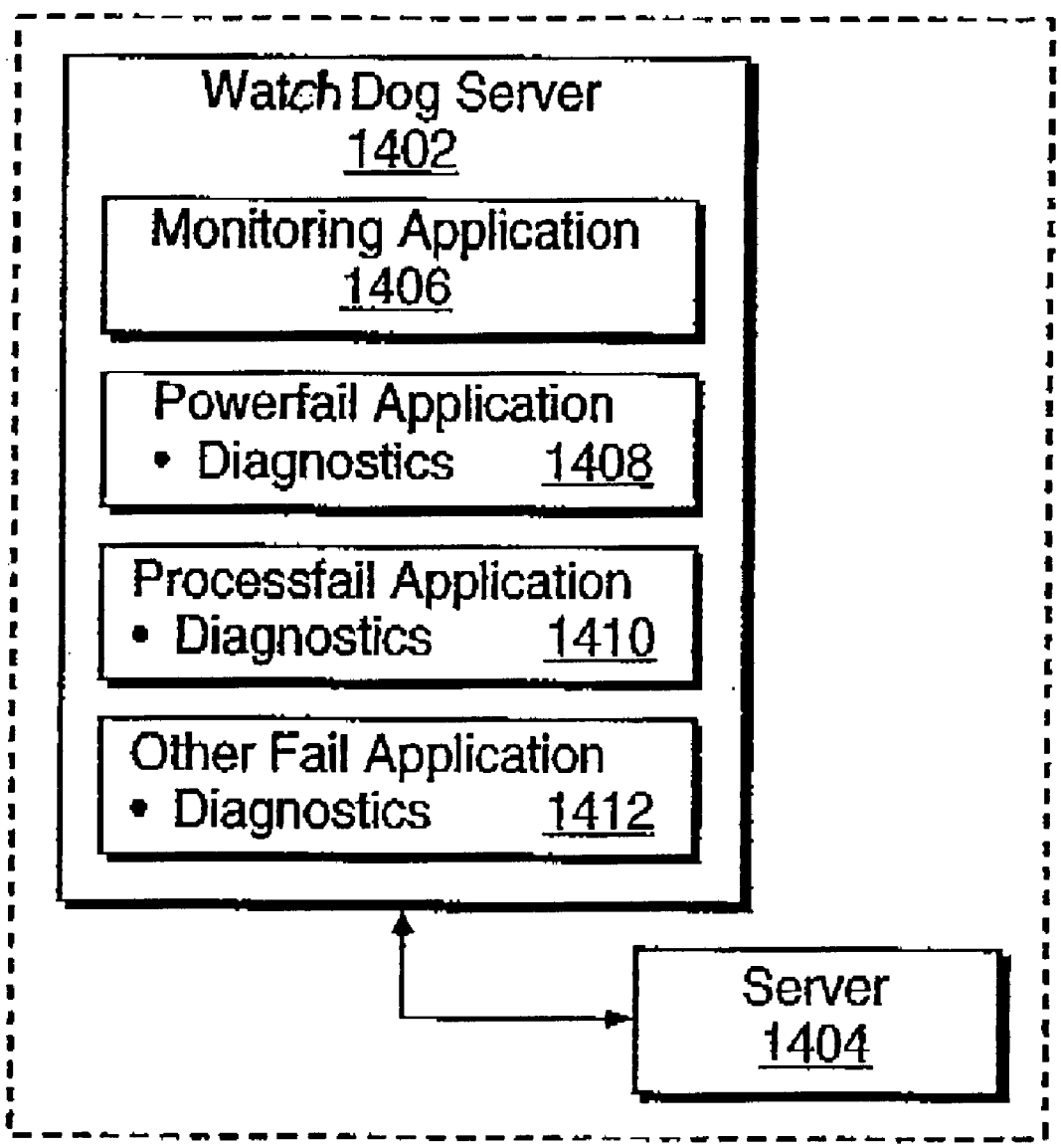
FIG. 10 illustrates a block schematic diagram of elements used for system recovery in accordance with the present invention.

Referring to FIG. 10, one embodiment of a watchdog server or daemon is diagrammatically illustrated. The watchdog server 1402 communicates with website server 1404, and includes a monitoring application 1406 configured enable a watchdog server or daemon to monitor a server. The server may also include a powerfail application 1408 that includes diagnostics for diagnosing power failure problems, including residual problems. Processfail application 1410 may also be included that includes diagnostics for diagnosing process failure problems, including residual problems that may have occurred. Other failure type applications 1412 and related diagnostics may also be included in the watchdog server.

In general, the invention may include the utilization of dedicated processors, webservers configured to receive and route browser requests, application servers, state servers and other types of computer processors configured to communicate amongst each other and that may be connected to one or more networks, including a Local Area Network (LAN), an intranet and the Internet. However, it will be appreciated by those skilled in the art, such implementation of such devices and systems are but few illustrations of the utility of the invention, and that the invention may have greater applicability and utility in many other applications where efficient routing and processing of data within one or more networks is involved. Equivalent structures embodying the invention could be configured for such applications without diverting from the spirit and scope of the invention. Although this embodiment is described and illustrated in the context of devices and systems for exchanging data among users of a computer system or network, the invention extends to other applications where similar features are useful. The invention may include personal computers, application servers, state servers or Internet webservers that are designed and implemented on a computer and may be connected to a network for communication with other computers to practice the invention. A system configured to operate according to the invention may include a plurality of personal computers connected to the Internet via individual modems or other communication means such as wireless communications.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively.

The apparatus and method include a method and apparatus for automatically deploying data within and synchronously with the operation of a software application. Although this embodiment is described and illustrated in the context of a software application for developing Internet websites, the scope of the invention extends to other applications where preservation of data at either a data source or destination is useful. Furthermore, while the foregoing description has been with reference to particular embodiments of the invention, it will be appreciated that these are only illustrative of the invention and that changes may be made to those embodiments without departing from the principles of the invention, the scope of which will be defined in subsequent utility applications claiming priority based on this application.

What is claimed is:

1. A method of and apparatus configured to enable the preservation and recovery of in-progress developments and changes of data as they occur in a system for development of the data in the event of a process or system failure, comprising, retrieving in-progress data from the system;

storing the in-progress data in a cache memory;

copying cache memory contents into a memory-mapped file, providing a redundant location for cache data that can be retrieved from in the event of a system failure.

2. A method according to claim 1, further comprising, in the event of a failure, recovering the cache information from the memory mapped file; and recovering and restarting the process or system after such a failure.

3. A method according to claim 2, wherein the recovering of the process or system includes invoking recovery scripts configured to cause recovery operations to commence.

4. A method according to claim 3, wherein the invocation of recovery scripts causes the system or process to be restarted.

5. A method according to claim 3, wherein invoking recovery scripts includes causing the reconfiguration of the application to occur so that it can resume operations.

6. A method according to claim 1, further comprising flushing in-progress data developments and changes stored in the memory mapped file after they are copied to another location.

7. A method according to claim 1, further comprising copying the contents of the memory mapped file to another memory location and flushing the memory mapped file after its contents are copied to the other memory location.

8. A method according to claim 1, wherein the retrieving of in-progress data is performed automatically, making the process transparent to the user of the system.

9. A method according to claim 1, wherein the retrieval of in-progress data occurs upon the occurrence of a trigger event.

10. A method according to claim 1, wherein the retrieval of in-progress data is performed in a manner in which the in-progress data is copied into the cache memory and the memory mapped file simultaneously.

11. A method according to claim 1, further comprising filtering the in progress data before copying the result to the memory mapped file.

12. A method according to claim 1, further comprising modifying the in progress data before copying the result to the memory mapped file.

13. A system preserving in-progress changes data development, comprising, a server monitor configured to monitor the operations of a server where data is being developed;

a cache memory configured to electronically store in-progress data, and including a cache write control configured to store the in-progress data in a redundant location; and a memory mapped file interface configured to copy the retrieved in-progress data from the cache memory location into a memory-mapped file to establish a redundant location for the retrieved data.

14. A system according to claim 13, further comprising:

a recovery mechanism configured to recover stored in-progress data in the event of a failure.

15. A system according to claim 13, further comprising, a recovery mechanism configured to recover stored in-progress data in the event of a failure, the recovery mechanism including recovery scripts configured to recover system operations when executed by the CPU.

16. A system according to claim 13, further comprising, a recovery mechanism configured to recover stored in-progress data in the event of a failure, the recovery mechanism including recovery scripts configured to recover the retrieved web content from the memory-mapped file.

17. A system according to claim 13, further comprising, a recovery mechanism configured to recover stored in-progress data in the event of a failure, the recovery mechanism including recovery scripts to restart the process of development and maintenance of web content.

18. A system according to claim 13, further comprising, a recovery mechanism configured to recover stored in-progress data in the event of a failure, the recovery mechanism including recovery scripts having validation tools configured to validate recovered data.

19. A system according to claim 13, further comprising, a recovery mechanism configured to recover stored in-progress data in the event of a failure, the recovery mechanism including recovery scripts including reconfigure scripts configured to reconfigure a process after a failure.

20. For use in a system for developing and maintaining web content, a method of recovering and preserving content being created and in-progress changes of web content being made from a work area for use in the event of failures, including process and system failures, to reduce the amount of data and process time lost in the event of such a failure, comprising, retrieving in-progress changes and in-progress development of web content from in a work area;

storing the retrieved web content in a cache memory location for preservation;

copying the retrieved web content from the cache memory location into a memory-mapped file to establish a redundant location for the retrieved web content;

flushing the memory mapped memory location after the retrieved data is stored in a memory location where the retrieved data no longer needs to be preserved; and in the event of a failure, recovering the system operations;

recovering the retrieved web content from the memory-mapped file; and restarting the process of development and maintenance of web content.

21. A system for developing and maintaining web content, configured with a method of recovering and preserving content being created and in-progress changes of web content being made from a work area for use in the event of failures, including process and system failures, to reduce the amount of data and process time lost in the event of such a failure, comprising, a server monitor configured to monitor the operations of a server where a work area resides, including the status of the server operations;

a cache memory configured to electronically store in-progress changes and in-progress development of web content from in a work area;

means for storing the retrieved web content in a cache memory location for preservation;

a memory mapped file interface configured to copy the retrieved web content from the cache memory location into a memory-mapped file to establish a redundant location for the retrieved web content;

a central processing unit (CPU) configured to execute flush cache code to flush the memory mapped memory location after the retrieved data is stored in a memory location according to a disk wrote control, where the retrieved data no longer needs to be preserved; and a recovery mechanism configured to recover web contact in the event of a failure, the recovery mechanism including recovery scripts configured to recover system operations when executed by the CPU, configured to recover the retrieved web content from the memory-mapped file; and to restart he process of development and maintenance of web content.

* * * * *